(12) United States Patent
Everett et al.

(10) Patent No.: US 7,730,311 B2
(45) Date of Patent: *Jun. 1, 2010

(54) KEY TRANSFORMATION UNIT FOR A TAMPER RESISTANT MODULE

(75) Inventors: David Barrington Everett, East Sussex (GB); Stuart James Miller, Berks (GB); Anthony David Peacham, Kent (GB); Ian Stephen Simmons, Cambs (GB); Timothy Philip Richards, Herts (GB); John Charles Viner, Windlesham (GB)

(73) Assignee: Multos Limited (GB)

( * ) Notice: Subject to any disclaimer, the term of this patent is extended or adjusted under 35 U.S.C. 154(b) by 266 days.

This patent is subject to a terminal disclaimer.

(21) Appl. No.: 11/977,945

(22) Filed: Oct. 25, 2007

(65) Prior Publication Data

US 2008/0059812 A1 Mar. 6, 2008

Related U.S. Application Data

(63) Continuation of application No. 11/729,509, filed on Mar. 29, 2007, which is a continuation of application No. 11/655,497, filed on Jan. 19, 2007, which is a continuation of application No. 09/932,013, filed on Aug. 17, 2001, now Pat. No. 7,469,339, and a continuation of application No. 09/023,057, filed on Dec. 12, 1998, now Pat. No. 6,575,372, which is a continuation of application No. 09/076,551, filed on May 12, 1998, now Pat. No. 6,317,832.

(60) Provisional application No. 60/046,514, filed on May 15, 1997, provisional application No. 60/046,543, filed on May 15, 1997.

(30) Foreign Application Priority Data

Feb. 21, 1997 (GB) ................................ 9703591.9

(51) Int. Cl.
*H04L 9/00* (2006.01)

(52) U.S. Cl. ....................... 713/172; 713/160; 380/278; 235/492

(58) Field of Classification Search ................... 713/172
See application file for complete search history.

(56) References Cited

U.S. PATENT DOCUMENTS

| 4,214,230 A | 7/1980 | Fak et al. |
| 4,218,582 A | 8/1980 | Hellman et al. |
| 4,259,720 A | 3/1981 | Campbell |
| 4,302,810 A | 11/1981 | Bouricius et al. |

(Continued)

FOREIGN PATENT DOCUMENTS

EP 0 152 024 B1 8/1985

(Continued)

OTHER PUBLICATIONS

Davies, D.W. et al., *Security for Computer Networks: An Introduction to Data Security in Teleprocessing and Electronic Funds Transfer*, John Wiley & Sons: New York, 1984.

(Continued)

*Primary Examiner*—Matthew B Smithers
(74) *Attorney, Agent, or Firm*—Sonnenschein Nath & Rosenthal LLP

(57) ABSTRACT

Methods, apparati, and computer-readable media for securely transporting a software application onto a tamper resistant module (TRM) (103) by using an individualized TRM key set. A method embodiment of the present invention comprises: storing a key pair unique to the TRM (103) in a memory located on the TRM (103), where the key pair comprises a TRM public key (150) and a TRM private key (190); retrieving the TRM public key from the TRM; encrypting a portion of the software application using the TRM public key (150); transmitting the encrypted software application to the TRM (103); and recovering and decrypting the encrypted software application using the TRM private key (190).

25 Claims, 11 Drawing Sheets

U.S. PATENT DOCUMENTS

| | | | |
|---|---|---|---|
| 4,305,059 A | 12/1981 | Benton | |
| 4,321,672 A | 3/1982 | Braun et al. | |
| 4,341,951 A | 7/1982 | Benton | |
| 4,405,829 A | 9/1983 | Rivest et al. | |
| 4,408,203 A | 10/1983 | Campbell | |
| 4,423,287 A | 12/1983 | Zeidler | |
| 4,442,345 A | 4/1984 | Mollier et al. | |
| 4,453,074 A | 6/1984 | Weinstein | |
| 4,467,139 A | 8/1984 | Mollier | |
| 4,498,000 A | 2/1985 | Decavele et al. | |
| 4,536,647 A | 8/1985 | Atalla et al. | |
| 4,578,530 A | 3/1986 | Zeidler | |
| 4,605,820 A | 8/1986 | Campbell, Jr. | |
| 4,629,872 A | 12/1986 | Hällberg | |
| 4,630,201 A | 12/1986 | White | |
| 4,650,978 A | 3/1987 | Hudson et al. | |
| 4,669,596 A | 6/1987 | Capers et al. | |
| 4,705,211 A | 11/1987 | Honda et al. | |
| 4,709,136 A | 11/1987 | Watanabe | |
| 4,709,137 A | 11/1987 | Yoshida | |
| 4,727,243 A | 2/1988 | Savar | |
| 4,727,244 A | 2/1988 | Nakano et al. | |
| 4,731,842 A | 3/1988 | Smith | |
| 4,734,568 A | 3/1988 | Watanabe | |
| 4,736,094 A | 4/1988 | Yoshida | |
| 4,742,215 A | 5/1988 | Daughters et al. | |
| 4,745,267 A | 5/1988 | Davis et al. | |
| 4,746,788 A | 5/1988 | Kawana | |
| 4,748,557 A | 5/1988 | Tamada et al. | |
| 4,748,668 A | 5/1988 | Shamir et al. | |
| 4,752,677 A | 6/1988 | Nakano et al. | |
| 4,757,185 A | 7/1988 | Onishi | |
| 4,757,543 A | 7/1988 | Tamada et al. | |
| 4,759,063 A | 7/1988 | Chaum | |
| 4,767,920 A | 8/1988 | Kitta et al. | |
| 4,778,983 A | 10/1988 | Ushikubo | |
| 4,785,166 A | 11/1988 | Kushima | |
| 4,786,790 A | 11/1988 | Kruse et al. | |
| 4,797,542 A | 1/1989 | Hara | |
| 4,797,920 A | 1/1989 | Stein | |
| 4,798,941 A | 1/1989 | Watanabe | |
| 4,802,218 A | 1/1989 | Wright et al. | |
| 4,803,347 A | 2/1989 | Sugahara et al. | |
| 4,811,393 A | 3/1989 | Hazard | |
| 4,816,653 A | 3/1989 | Anderl et al. | |
| 4,816,654 A | 3/1989 | Anderl et al. | |
| 4,825,052 A | 4/1989 | Chemin et al. | |
| 4,831,245 A | 5/1989 | Ogasawara | |
| 4,833,595 A | 5/1989 | Iijima | |
| 4,839,504 A | 6/1989 | Nakano | |
| 4,839,792 A | 6/1989 | Iijima | |
| 4,849,614 A | 7/1989 | Watanabe et al. | |
| 4,853,522 A | 8/1989 | Ogasawara | |
| 4,853,961 A | 8/1989 | Pastor | |
| 4,874,935 A | 10/1989 | Younger | |
| 4,877,945 A | 10/1989 | Fujisaki | |
| 4,877,947 A | 10/1989 | Mori | |
| 4,879,747 A | 11/1989 | Leighton et al. | |
| 4,882,474 A | 11/1989 | Anderl et al. | |
| 4,887,234 A | 12/1989 | Iijima | |
| 4,891,503 A | 1/1990 | Jewell | |
| 4,891,506 A | 1/1990 | Yoshimatsu | |
| 4,900,904 A | 2/1990 | Wright et al. | |
| 4,901,276 A | 2/1990 | Iijima | |
| 4,906,828 A | 3/1990 | Halpern | |
| 4,907,270 A | 3/1990 | Hazard | |
| 4,926,480 A | 5/1990 | Chaum | |
| 4,935,962 A | 6/1990 | Austin | |
| 4,949,257 A | 8/1990 | Orbach | |
| 4,961,142 A | 10/1990 | Elliott et al. | |
| 4,969,188 A | 11/1990 | Schöbi | |
| 4,977,595 A | 12/1990 | Ohta et al. | |
| 4,984,270 A | 1/1991 | LaBounty | |
| 4,985,615 A | 1/1991 | Iijima | |
| 4,987,593 A | 1/1991 | Chaum | |
| 4,993,068 A | 2/1991 | Piosenka et al. | |
| 4,995,081 A | 2/1991 | Leighton et al. | |
| 4,996,711 A | 2/1991 | Chaum | |
| 5,001,753 A | 3/1991 | Davio et al. | |
| 5,003,594 A | 3/1991 | Shinagawa | |
| 5,005,200 A | 4/1991 | Fischer | |
| 5,010,239 A | 4/1991 | Mita | |
| 5,012,074 A | 4/1991 | Masada | |
| 5,012,076 A | 4/1991 | Yoshida | |
| 5,014,312 A | 5/1991 | Lisimaque et al. | |
| 5,016,274 A | 5/1991 | Micali et al. | |
| 5,038,025 A | 8/1991 | Kodera | |
| 5,068,894 A | 11/1991 | Hoppe | |
| 5,093,862 A | 3/1992 | Scwartz | |
| 5,097,115 A | 3/1992 | Ogasawara et al. | |
| 5,120,939 A | 6/1992 | Claus et al. | |
| 5,128,997 A | 7/1992 | Pailles et al. | |
| 5,131,038 A | 7/1992 | Puhl et al. | |
| 5,142,578 A | 8/1992 | Matyas et al. | |
| 5,146,499 A | 9/1992 | Geffrotin | |
| 5,148,481 A | 9/1992 | Abraham et al. | |
| 5,161,231 A | 11/1992 | Iijima | |
| 5,162,989 A | 11/1992 | Matsuda | |
| 5,163,098 A | 11/1992 | Dahbura | |
| 5,164,988 A | 11/1992 | Matyas et al. | |
| 5,165,043 A | 11/1992 | Miyahara et al. | |
| 5,166,503 A | 11/1992 | Mizuta | |
| 5,175,416 A | 12/1992 | Mansvelt et al. | |
| 5,180,901 A | 1/1993 | Hiramatsu | |
| 5,191,193 A | 3/1993 | Le Roux | |
| 5,191,608 A | 3/1993 | Geronimi | |
| 5,200,999 A | 4/1993 | Matyas et al. | |
| 5,201,000 A | 4/1993 | Matyas et al. | |
| 5,202,922 A | 4/1993 | Iijima | |
| 5,214,702 A | 5/1993 | Fischer | |
| 5,224,162 A | 6/1993 | Okamoto et al. | |
| 5,243,175 A | 9/1993 | Kato | |
| 5,247,578 A | 9/1993 | Pailles et al. | |
| 5,293,577 A | 3/1994 | Hueske et al. | |
| 5,371,797 A | 12/1994 | Bocinsky, Jr. | |
| 5,378,884 A | 1/1995 | Lundstrom et al. | |
| 5,420,405 A | 5/1995 | Chasek | |
| 5,452,431 A | 9/1995 | Bournas | |
| 5,473,690 A | 12/1995 | Grimonprez et al. | |
| 5,485,520 A | 1/1996 | Chaum et al. | |
| 5,511,121 A | 4/1996 | Yacobi | |
| 5,517,011 A | 5/1996 | Vandenengel | |
| 5,530,232 A | 6/1996 | Taylor | |
| 5,534,857 A | 7/1996 | Laing et al. | |
| 5,539,825 A | 7/1996 | Akiyama et al. | |
| 5,542,081 A | 7/1996 | Geronimi | |
| 5,544,246 A | 8/1996 | Mandelbaum et al. | |
| 5,546,523 A | 8/1996 | Gatto | |
| 5,557,516 A | 9/1996 | Hogan | |
| 5,574,269 A | 11/1996 | Mori et al. | |
| 5,578,808 A | 11/1996 | Taylor | |
| 5,581,708 A | 12/1996 | Iijima | |
| 5,588,146 A | 12/1996 | Leroux | |
| 5,682,027 A | 10/1997 | Bertina et al. | |
| 5,692,132 A | 11/1997 | Hogan | |
| 5,699,528 A | 12/1997 | Hogan | |
| 5,704,046 A | 12/1997 | Hogan | |
| 5,705,798 A | 1/1998 | Tarbox | |
| 5,708,780 A | 1/1998 | Levergood et al. | |
| 5,715,314 A | 2/1998 | Payne et al. | |
| 5,724,424 A | 3/1998 | Gifford | |
| 5,745,571 A * | 4/1998 | Zuk | 380/285 |
| 5,796,831 A | 8/1998 | Paradinas et al. | |
| 5,825,875 A | 10/1998 | Ugon | |

| | | | |
|---|---|---|---|
| 5,841,870 A | 11/1998 | Fieres et al. | |
| 5,889,941 A | 3/1999 | Tushie et al. | |
| 6,005,942 A * | 12/1999 | Chan et al. | 713/187 |
| 6,038,551 A | 3/2000 | Barlow et al. | |
| 6,233,683 B1 * | 5/2001 | Chan et al. | 713/172 |

FOREIGN PATENT DOCUMENTS

| | | |
|---|---|---|
| EP | 0 157 303 B1 | 10/1985 |
| EP | 0 190 733 B1 | 8/1986 |
| EP | 0 218 176 B1 | 4/1987 |
| EP | 0 261 030 B1 | 3/1988 |
| EP | 0 275 510 B1 | 7/1988 |
| EP | 0 292 248 A2 | 11/1988 |
| EP | 0 325 506 B1 | 7/1989 |
| EP | 0 328 289 B1 | 8/1989 |
| EP | 0 354 793 B1 | 2/1990 |
| EP | 0 451 936 B1 | 10/1991 |
| EP | 0 466 969 B1 | 1/1992 |
| EP | 0 475 837 B1 | 3/1992 |
| EP | 0 537 756 B1 | 4/1993 |
| EP | 0 540 095 B1 | 5/1993 |
| EP | 0 547 741 A1 | 6/1993 |
| EP | 0 559 205 B1 | 9/1993 |
| EP | 0 588 339 B1 | 3/1994 |
| EP | 0 594 493 B1 | 4/1994 |
| EP | 0 636 998 B1 | 2/1995 |
| EP | 0 647 902 B1 | 4/1995 |
| EP | 0 666 550 B1 | 8/1995 |
| EP | 0 686 947 B1 | 12/1995 |
| EP | 0 707 290 B1 | 4/1996 |
| EP | 0 751 460 A2 | 1/1997 |
| FR | 2 536 928 A1 | 6/1984 |
| FR | 2 667 171 A1 | 3/1992 |
| FR | 2 687 816 A1 | 8/1993 |
| GB | 2 284 689 A | 6/1995 |
| JP | 64-81084 | 3/1989 |
| JP | 2592856 | 3/1997 |
| WO | WO 87/07062 A1 | 11/1987 |
| WO | WO 88/09019 A1 | 11/1988 |
| WO | WO 90/05960 A1 | 5/1990 |
| WO | WO 91/01538 A1 | 2/1991 |
| WO | WO 91/16691 A1 | 10/1991 |
| WO | WO 92/13322 A1 | 8/1992 |
| WO | WO 93/20538 A1 | 10/1993 |
| WO | WO 93/21612 A1 | 10/1993 |
| WO | WO 95/22810 | 8/1995 |
| WO | WO 96/19771 A1 | 6/1996 |
| WO | WO 96/28795 A1 | 9/1996 |
| WO | WO 96/38825 A1 | 12/1996 |
| WO | WO 98/43212 A1 | 10/1998 |
| WO | WO 99/10824 A1 | 3/1999 |
| WO | WO 99/16031 A1 | 4/1999 |
| WO | WO 99/16031 A3 | 4/1999 |

OTHER PUBLICATIONS

Ferreira, Ronald et al., "Key Management Protocols Using Smart Card," *Smart Card 2000: The Future of IC Cards*, Proc of IFIP WG 11.6 Int. Conf, Laxenburg, Austria, pp. 167-177, Oct. 19-20, 1987.

* cited by examiner

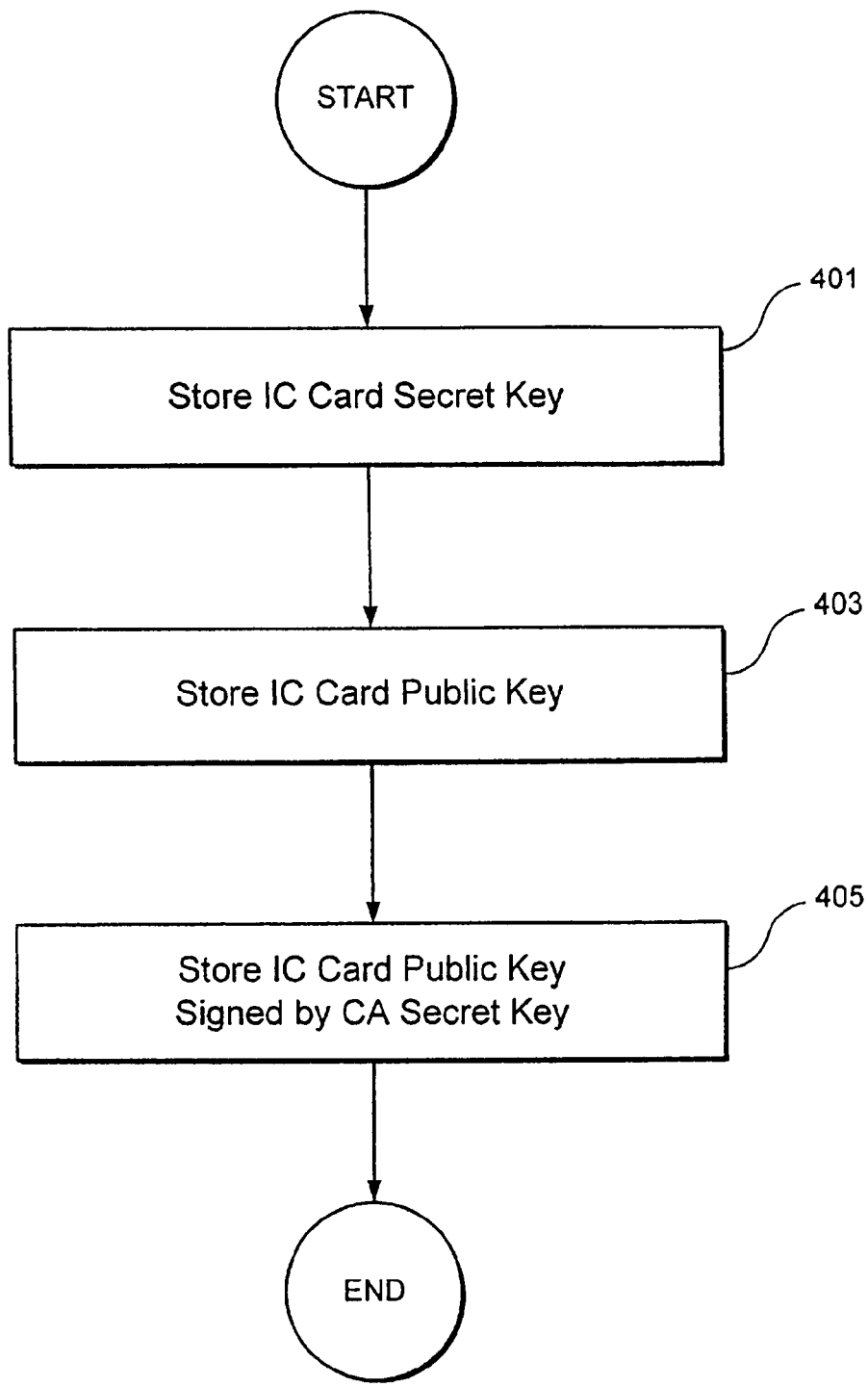
F I G. 4

KEY TRANSFORMATION UNIT FOR A TAMPER RESISTANT MODULE

CROSS REFERENCES TO RELATED APPLICATIONS

This patent application is a continuation of and claims priority to U.S. patent application Ser. No. 11/729,509, filed on Mar. 29, 2007; patent application Ser. No. 11/729,509 is a continuation of and claims priority to U.S. patent application Ser. No. 11/655,497, filed on Jan. 19, 2007; patent application Ser. No. 11/655,497 is a continuation of and claims priority to U.S. patent application Ser. No. 09/932,013, filed on Aug. 17, 2001 now U.S. Pat. No. 7,469,339; patent application Ser. No. 09/932,013 is a continuation of and claims priority to U.S. patent application Ser. No. 09/076,551, filed on May 12, 1998, now U.S. Pat. No. 6,317,832, entitled "Secure Multiple Application Card System and Process"; patent application Ser. No. 09/076,551 claims the priority benefit of U.S. provisional patent application No. 60/046,514 filed on May 15, 1997, entitled "Design for a Multi Application Smart Card", and further claims the priority benefit of U.S. provisional patent application No. 60/046,543 filed on May 15, 1997; and patent application Ser. No. 09/076,551 is a continuation of and claims priority to U.S. patent application Ser. No. 09/023, 057, filed on Feb. 12, 1998, now U.S. Pat. No. 6,575,372, entitled "Secure Multi-Application IC Card System Having Selective Loading and Deleting Capability"; and this instant application also claims the priority benefit of U.S. provisional patent application 60/046,514 filed on May 15, 1997, entitled "Design for a Multi Application Smart Card"; U.S. provisional patent application 60/046,543 filed on May 15, 1997, entitled "Virtual Machine for a Multi Application Smart Card"; and Great Britain patent application 9703591.9 filed on Feb. 21, 1997 and entitled "Multiple Application Computer System." All eight of these prior patent applications are hereby incorporated by reference into the present patent application in their entireties.

TECHNICAL FIELD

This invention pertains to the field of distribution of computer software applications, and, in particular, for providing secure transmission of the software applications and secure loading of the software applications onto tamper resistant modules.

BACKGROUND OF THE INVENTION

The invention relates to a computer system in which a population of computers has access to multiple software applications. The computers may be personal computers (PC's) or, for example, integrated circuit cards ("IC cards"), also known as "smart cards". The applications may be programs available from a variety of sources, including computer tape or disc, and, in particular, remote computers with which a serial link, typically by telephone, is established.

In the PC environment, it is customary to distribute applications on floppy discs or CD ROMS and to retain them on a local hard disc for operation. In many ways, this is inconvenient, demanding high capacity local storage media and presenting difficulties with updates. In the field of smart cards, the problem of local application storage is much more acute, because storage capacity in the integrated circuit is relatively very limited. A solution in both cases is to make available applications held remotely and download them via a remote link. Internet and intranet systems are ideal vehicles for this, and it is possible to run PC's from Internet application modules (or "applets" as they are called) for immediate running and then to discard the applets. The applets require no local long-term storage capacity. An example of such a system is JAVA.

Several difficulties are associated with downloaded applications. One is hardware compatibility. Different computers have different microprocessors and different operating systems. It has been customary to re-write applications to cater to different computers, but this is cost-effective only for large, widely used, and static applications. It is not practicable for applets. A second problem is control of the applets. Without control, it would be possible for applets to make direct hardware calls to take control of local storage or communication devices. This could be mischievous at best and severely damaging or criminal at worst.

JAVA meets these two difficulties by ensuring that the applets are written in a common high-level interpreted language and that a local interpreter processes the applet instructions. Thus, all applets are written in the same language, and the interpreter constitutes both a hardware buffer and a control buffer. Similarly, and for the same reasons, proposals have been made for on-board interpreters in smart cards to run downloaded high-level language applications.

The wide availability of multiple applications to a population of computers raises another problem. For various reasons, it may be desirable to restrict the availability of certain applications to certain computers. For example, some applications may make demands which the hardware of a particular computer cannot meet. These represent technical limitations present in spite of the interpreter arrangement. Furthermore, there may be commercial or moral restraints to be placed on the accessibility of certain applications to certain computers. The present invention seeks to provide a solution to this problem.

IC cards are becoming increasingly used for many different purposes in the world today. An IC card typically is the size of a conventional credit card which contains a computer chip including a microprocessor, read-only-memory (ROM), electronically erasable programmable read only memory (EEPROM), an Input/Output (I/O) mechanism, and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the IC card itself. This allows a card user to run many programs stored in the IC card (for example, credit/debit, electronic money/purse, and/or loyalty applications), irrespective of the type of terminal (i.e., ATM, telephone, and/or POS) in which the IC card is inserted for use.

A conventional single application IC card, such as a telephone card or an electronic cash card, is loaded with a single application at its personalization stage when it is manufactured and before it is given to a card user. That application, however, cannot be modified or changed after the IC card is issued, even if the modification is desired by the IC card user or issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy, and inconvenient.

Therefore, it is beneficial to store multiple applications on the same IC card. For example, a card user may have both a purse application and a credit/debit application on the same IC card, so that the user could select which type of payment (by electronic cash or credit card) to use to make a purchase. Multiple applications could be provided to an IC card if sufficient memory exists and an operating system capable of supporting multiple applications is present on the IC card. Although multiple applications could be preselected and placed in the memory of the IC card during its production stage, it would also be beneficial to have the ability to load and delete applications for the IC card post-production as needed.

The increased flexibility and power of storing multiple applications on a single IC card create new challenges to be overcome concerning the integrity and security of the information (including application code and associated data) exchanged between the individual IC card and the application provider, as well as within the entire system when loading and deleting applications. It would be beneficial to have the capability in the IC card system to exchange data among IC cards, IC card issuers, system operators and application providers securely and to load and delete applications securely at any time from a local terminal or remotely over a telephone line, Internet, or intranet connection or other data conduit. Because these data transmission lines are not typically secure lines, a number of security and entity authentication techniques must be implemented to make sure that applications being sent over the transmission lines are not tampered with and are loaded onto the intended IC cards only.

As mentioned, it is important—particularly where there is a continuing wide availability of new applications to the cardholder—that the system has the capability of adding applications onto the IC card subsequent to issuance. This is necessary to protect the longevity of the IC cards; otherwise, once an application becomes outdated, the IC card would be useless. It would be beneficial to allow the addition of applications from a remote location as well as from a direct connection to an application provider's terminal. For example, it would be beneficial for a card user to be able to plug his or her IC card into a home computer and download an application over the Internet. This type of remote loading of applications raises a number of security risks when transmitting the application code and related data over an unsecured communications line such as the Internet. Several issues need to be addressed in a system which provides such a capability.

One issue is to make sure that the IC card receiving the application is the intended IC card and not another IC card. A second issue is determining how the IC card can authenticate that the application came from the proper application provider and not an unknown third party. A third issue concerns preventing third parties from reading the application and making an unauthorized copy. If a portion of the application is encrypted to address the latter issue, the intended IC card needs to have access to the correct key to decrypt the application. In a system with many IC cards and additionally many application providers, a secure key transfer technique is required so that the intended IC card can use the correct key for the application which is received. These concerns are raised by both remote application loading as well as by local terminal application loading.

Accordingly, it is an object of this invention to provide a key transfer and authentication technique, and specifically to provide a secure IC card system that allows for the secure transfer of smart card applications which may be loaded onto IC cards.

A further security issue is that an entity which transmits an application or data to an IC card requires that only the intended IC card should receive the transmitted data. Third parties should not be able to intercept and view the data. Additionally, a transmitting entity will require verification that the IC card which has requested information is actually part of the overall IC card system and not simply posing as being part of the system. These concerns are also raised by both remote application loading as well as by local terminal application loading.

Accordingly, it is an object of this invention to provide secure transfer techniques, and, specifically, to provide a secure IC card system that allows for the secure transfer of data, including smart card applications which may be loaded onto IC cards.

According to the invention, a computer system comprises a population of computers; tamper-resistant modules each associated respectively with one of said computers; a plurality of computer applications; provider means for holding the computer applications; and means for coupling the provider means to the computers for downloading the computer applications to the computers.

The computers may be personal computers (PC's) or any other types of computers, in which case the tamper-resistant modules may be smart cards read by readers coupled to the computers or, for example, dongles, PC cards, or PCMCIA cards coupled to the computers. Furthermore, although the following description of the preferred embodiments revolves around a discussion of IC cards (or "smart cards"), the presently claimed methods and apparati are applicable to all tamper resistant modules generally, and not just to such cards. Thus, the term "tamper resistant module" can be used in lieu of the term "IC card" or "smart card" throughout this written description. The term "tamper resistant module" includes, but is not limited to, one or more IC cards, smart cards, dongles, PC cards, and/or PCMCIA cards. The IC cards, smart cards, dongles, PC cards, and/or PCMCIA cards may be coupled to one or more computers.

DISCLOSURE OF INVENTION

Methods, apparati, and computer-readable media for securely transporting a software application onto a tamper resistant module (TRM) (103) by using an individualized TRM key set. A method embodiment of the present invention comprises storing a key pair unique to the TRM (103) in a memory located on the TRM (103), where the key pair comprises a TRM public key (150) and a TRM private key (190); retrieving the TRM public key from the TRM; encrypting a portion of the software application using the TRM public key (150); transmitting the encrypted software application to the TRM (103); and recovering and decrypting the encrypted software application using the TRM private key (190). As used throughout this patent application, including the claims, "portion" can mean anything from a de minimus portion to 100% of the software application. Furthermore, "portion" can mean more than one portion.

BRIEF DESCRIPTION OF THE DRAWINGS

Further objects, features, and advantages of the invention will become apparent from the following detailed description taken in conjunction with the accompanying Figures showing illustrative embodiments of the invention, in which:

FIG. 4 is a flow chart of steps for providing an individual key set for an IC card;

Figure 1A:
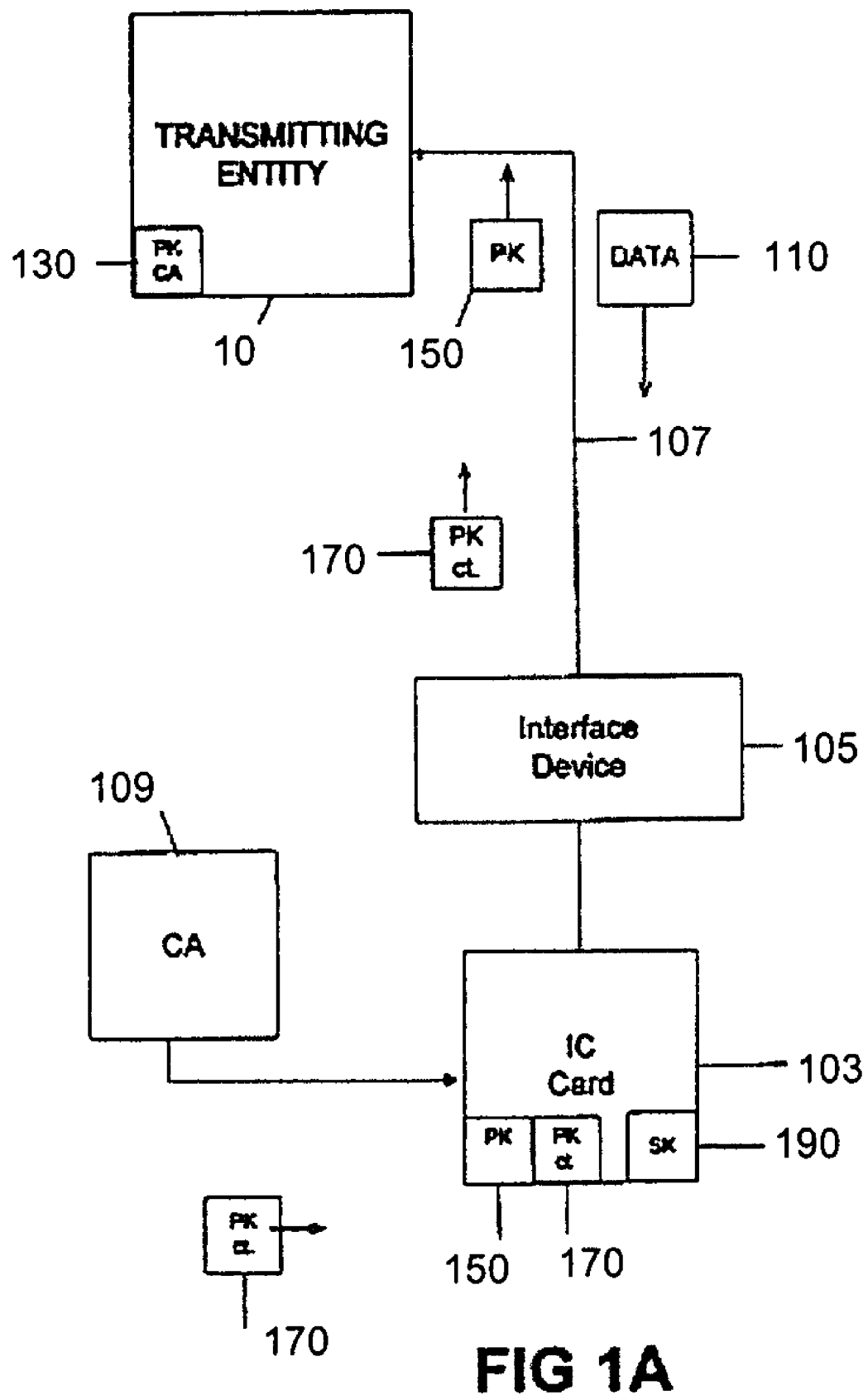
FIG. 1A is a block diagram of the secure data transfer system which securely transfers data from a transferring entity to an IC card.

Throughout the Figures, the same reference numerals and characters, unless otherwise stated, are used to denote like features, elements, components, or portions of the illustrated embodiments. Moreover, while the subject invention will now be described in detail with reference to the Figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

It is beneficial to have the capability to load applications onto IC cards containing multiple application operating systems at any time during the lifetime of the IC card or other tamper resistant module. This flexibility allows a user of an IC card to periodically add new applications to the IC card, and also allows older applications to be updated with newer versions of the application when they are released. For example, a card user may start with an IC card that contains a purse, or electronic cash application (e.g., MONDEX™), being stored on his IC card. Some time after the user has the IC card, he or she may load an additional application, such as a credit/debit application, onto the IC card. Some time after loading the credit/debit application onto the IC card, a new version of the credit/debit application may become available, and the card user should be able to erase the old application on his IC card and replace it with the new version of the credit/debit application, which may contain additional features. Additionally, an IC card needs to receive data regarding personal information, such as new credit card account numbers or updated information.

The flexibility of loading applications and transmitting data at different times during the IC card's life cycle creates security issues with the process of loading applications onto the IC card. In a multiple application operating system environment, it is beneficial to be able to load applications and data both at terminals, such as a bank ATM machine, as well as over remote communication links, such as telephone lines, cable lines, the Internet, satellite, or other communications means. When loading applications and data onto an IC card, the application provider and the card issuer (which could be the same entity) need to provide security regarding the applications to be loaded. First, the application provider must make sure the application is sent only to the correct card user who is intended to receive the application. One solution to this problem is addressed in a related patent, U.S. Pat. No. 6,575,372, entitled "Secure Multi-Application IC Card System Having Selective Loading and Deleting Capability" by Everett et al., assigned to the assignee of the present invention.

Two additional security concerns also need to be addressed when loading an application from a remote source, or even from a local terminal, onto an IC card. First, the source of the application must be authenticated as the proper originator so that applications which may contain viruses or simply take up the limited storage memory in an IC card are not allowed to be loaded onto the IC card. Second, the application and associated data may contain private or trade secret information which needs to be encrypted, so entities other than the IC card cannot view the contents of the encrypted application code and data. A portion of the application code and data may be secret while other portions are not. These concerns of authentication and protecting the contents of some or all of the application and associated data being loaded onto an IC card are addressed herein.

A number of encryption/decryption techniques are described herein. There are two basic types of encryption, symmetric encryption and asymmetric encryption. Symmetric encryption uses a private key as part of a mathematical formula which encrypts data by transforming the data using the formula and key. After the data is encrypted, another party can decrypt the encrypted data using the same private key with a related decryption algorithm. Thus, the same key is used for encryption and decryption, so the technique is symmetric. A conventional example of a symmetric algorithm is the Data Encryption Standard (DES).

Asymmetric encryption techniques use two different keys of a pair for encrypting and decrypting information. The two keys are normally referred to as a private (or secret) key, and a public key. When data is encrypted with one key of the pair, the other key is used to decrypt the data. If a sender of data signs the data (or a digest of the data) with his private key, forming what is called a digital signature, anyone with the public key can verify the authenticity of the message. When person A wants to authenticate a message to person B, person A signs the document with his private key. When person B receives the message, he uses person A's public key to verify the authenticity of the message. If the message is verified with the public key, person B knows that the document was signed with the private key of person A. Thus, the origin of the message has been authenticated.

The asymmetric key set can also be used to confidentially protect the contents of a message. If person A wants to send an encrypted message to person B that no one else can read, person A encrypts the data or message with person B's public key and sends it to person B. Now only the holder of person B's private key can decrypt the data. When a combination of keys is used, a person can both authenticate and encrypt the message. The asymmetric pair of keys has some powerful applications with respect to IC card security, and is more robust than symmetric encryption. However, asymmetric encryption is relatively more processor costly (processor cost is associated with computation time) compared with symmetric encryption. An example of asymmetric encryption method is RSA™.

A hybrid of symmetric encryption which makes the encryption method more powerful is to encrypt data using two symmetric keys. This technique, called triple DES, encodes data with symmetric key 1, decodes the data using symmetric key 2 (which in effect further encodes the data), and then further encodes the data using key 1 again. Once the data has arrived at its destination, key 1 is used to decode the data, key 2 is used to encode the data, and key 1 is used to decode the data. These extra steps of encoding and decoding make the technique more powerful and more difficult to properly decipher without both keys.

FIG. 1A shows a block diagram of entities used in transporting data in a secure manner in an IC card system. The transmitting entity 10 can be a card issuer, bank, IC card, or other entity which desires to transport data to an IC card 103. The transmitting entity 10 preferably initiates the data transfer process. Alternatively, the IC card 103 can initiate the data transfer process when the IC card requires data from the transmitting entity 10.

The transmitting entity 10 is coupled to interface device 105 (e.g., a terminal that communicates with an IC card). Data conduit 107 can be a telephone line, an intranet, the Internet, a satellite link, or any other type of communications link. In this example, the transmitting entity 10, which is remotely located from IC card 103, desires to send data in a secure manner to the IC card 103. However, because the data link is an "open" link (i.e. not a private link) and subject to third parties possibly intercepting or replacing data being transmitted, security measures are needed to guarantee that only the intended IC card receives the transmitted data. The certificate Authority (CA) 109 can also be used to authenticate that the IC card 103 has been validated as part of the IC card system.

In FIG. 1A, a private (or secret) key 190, and corresponding public key 150, are generated for IC card 103. The keys are preferably generated using an asymmetric encryption algorithm such as RSA™. The keys can be generated at the CA 109, or any other location, because they are specific only to the IC card 103, and no other copies need be kept. A third data item, the public key certificate 170, is also generated and stored on the IC card 103.

The public key certificate 170 is generated by signing the public key 150 with the private key of the CA 109. This allows a person with the public key of the CA 109 to verify that the CA 109 digitally signed the IC card's public key 150 in order to certify the IC card's individual key set. The public key certificate can be generated by the CA 109 at the time the IC card private/public key set is generated or at a subsequent time.

When a data transfer is initiated by the transmitting entity 10, the IC card 103 is contacted through the interface device 105, and the IC card 103 sends its public key 150 and its public key certificate 170 to the transmitting entity 10. The transmitting entity 10 then verifies the public key certificate 170 with the public key 130 of the CA 109 (public key 130 is publicly available from the CA 109 and may be stored in the transmitting entity 10), thus determining whether the CA 109 digitally signed the public key 170 and verifying that the IC card 103 is a valid IC card.

The transmitting entity 10 then encrypts the data to be transmitted with the IC card's public key 170. The transmitting entity 10 then transmits the encrypted data 110 to the interface device 105 and to the IC card 103. The IC card 103 decrypts the encrypted data with its corresponding private (also called secret) key 190. The data can then be processed by the IC card 103. Only the IC card 103 has a copy of its private key 109, so only the intended IC card 103 can access the encrypted data 110. This ensures that third parties cannot access the encrypted data 110, and correspondingly that only the intended IC card 103 is able to read and process the data.

Figure 1B:
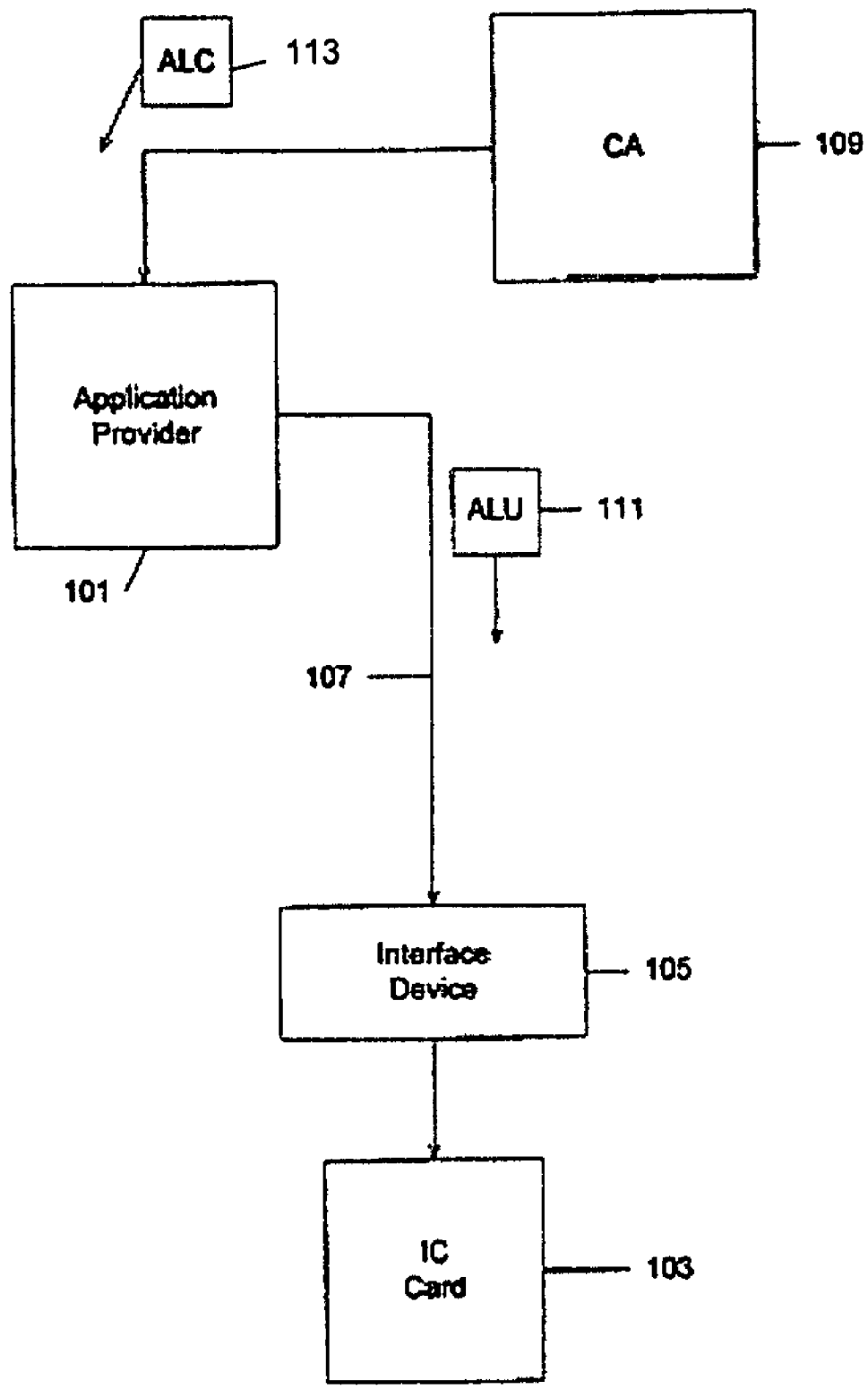
FIG. 1B is block diagram of the application loading system which loads an application from an application provider to an IC card.

FIG. 1B shows a block diagram of the entities used in a secure method for loading applications onto an IC card 103. The application provider 101 can be an IC card issuer, bank or other entity which provides application loading services. The application provider 101 initiates an application loading process onto IC card 103. Application provider 101 is coupled to data conduit 107, which is coupled to interface device 105 (e.g., a terminal that communicates with an IC card 103).

Data conduit 107 can be a telephone line, an intranet, the Internet, a satellite link, or any other type of communications link. The application provider 101, which is remotely located from the IC card 103, desires to send and load an application to the IC card 103. However, because the data link 107 is an open link and subject to third parties possibly intercepting or replacing applications being transmitted, security measures which authenticate the application itself, the application provider 101 and the IC card 103 must be used to ensure the integrity of the system. The certificate authority (CA) 109 may also be used to help authenticate that some data being transferred is part of an identified system.

In FIG. 1B, the application provider sends an application load unit (ALU) 111 to the interface device 105 and finally to IC card 103. The ALU 111 includes the application itself and security data required to authenticate and protect the application code and associated data. ALU 111 is discussed specifically in FIG. 2 and in connection with the other Figures herein. ALU 111 also preferably contains application load certificate (ALC) 113 data which is sent from the CA 109 to the application provider 101. CA 109 manages the overall security of the system by providing an ALC 113 for each application which is to be loaded onto an IC card. The application provider 101 and the IC card 103 both have individual public/private keys sets. The authentication and security processes will now be described.

Figure 2:
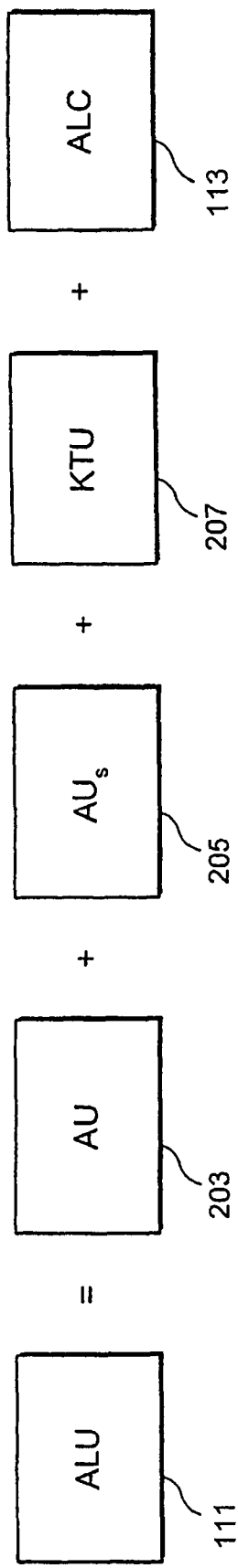
FIG. 2 is a graphic representation of the contents of an application loading unit.

FIG. 2 shows a diagram illustrating the components of an ALU 111 which is sent from the application provider 101 to the IC card 103 during the application load process. ALU 111 contains an application unit (AU) 203, an application unit signature ($AU_s$.) 205, a key transformation unit (KTU) 207, and an ALC 113. The ALU 111 is formatted in a conventional format used during data transmission. AU 203 contains the application code and data which are to be stored on the IC card, some or all of which is encrypted to protect a secret portion or portions of the code and/or data. AU 203 is described in further detail in connection with FIG. 3.

$AU_s$ 205 is the application code and data AU 203 digitally signed with the private key of the application provider 101. The public key of the application provider 101 is sent as part of the ALC 113, and is used to authenticate the application provider 101 as the originator of the application. ALC 113, is made up of IC card identification information and the application provider's public key and is signed by the private key of the certification authority 109. All these elements will be described in more detail below.

Key transformation unit (KTU) 207 contains information relating to the encryption of the AU 203 (the code and data of the application), which allows the IC card 103 to decrypt the encrypted portions so that the application and data can be accessed by the IC card 103 while still being protected during transmission between the application provider 101 and the IC card 103. KTU 207 is encrypted with the public key of the IC card 103 for which the application is intended, so as to ensure that only the intended IC card 103 can decrypt the application code and data using the KTU 207 information. This element will be described in connection with FIG. 5.

Figure 3:
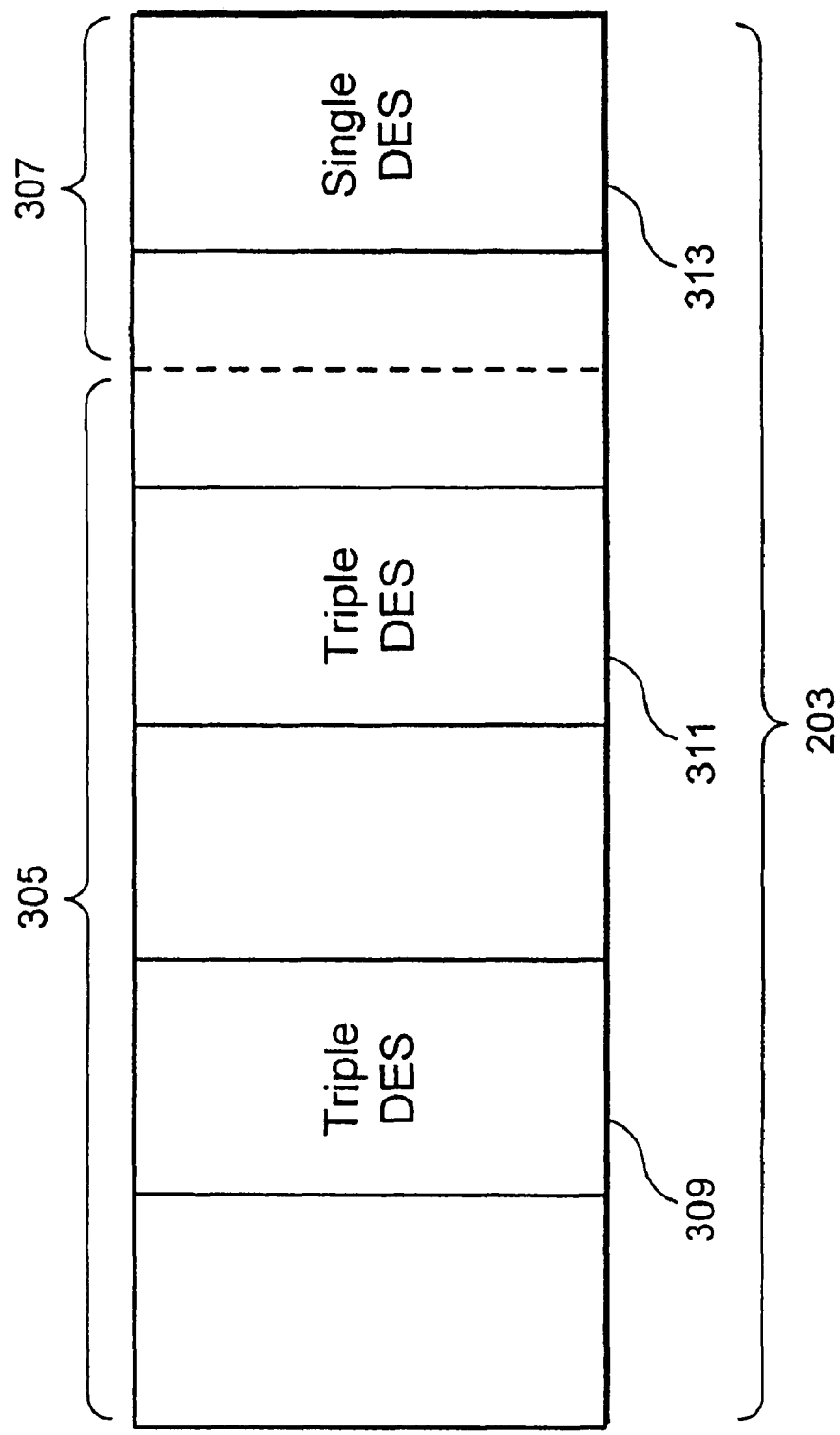
FIG. 3 is a graphic representation of an application unit.

FIG. 3 shows a graphic representation of the AU 203 which is part of the application load unit 111. The AU 203 contains both the program code and associated data which is to be loaded onto the IC card 103. The program code consists of a number of program instructions which are executed by the microprocessor on the IC card 103. The program instructions can be written in any programming language which the operating system stored on the IC card 103 can interpret.

For example, in the MULTOS system, the program can be written in MEL™ (MULTOS Executable Language). Most applications have associated data which must be loaded onto the IC card 103. For instance, data which identifies the IC card user such as a person's name or account number may be loaded in a secure manner with the credit/debit application. An application provider 101 may provide electronic cash, represented by data, as a promotion when installing an electronic purse application. Some or all of this data is desired to be kept secret from third parties. Additionally, the application code itself may be considered proprietary and portions may be desired to be kept secret from others. The use of key transformation unit 207 allows an application provider 101 to designate and encrypt selected portions of its application as confidential and protect it from third parties.

Application unit (AU) portion 305 indicates the program code which is to be transferred from the application provider 101 to the IC card 103. AU portion 307 indicates the associated data which is to be transferred as part of the application to be loaded onto the IC card 103. In this example, three discrete areas of the application unit are shown to be encrypted using either single DES or triple DES. Any number of variations regarding the portions encrypted and the type of encryption can be employed using the techniques described herein.

In this example, encrypted location 309 shows the first portion of the AU 203, which has been encrypted using a triple DES technique. The encryption process, as described above, involves using a symmetric key and the conventionally known DES-based algorithm to transform the data. The data can later be recovered by applying a key to the known DES-based decryption algorithm. Encrypted location 311 shows a second portion of the application unit 203, which has been encrypted using triple DES. Encrypted location 313 shows a third portion, which is encrypted using single DES. Single DES requires less computation to decrypt and takes up less space as part of the key transformation unit (KTU) 207 as described below. If the AU 203 were intercepted by a third party while it was being transmitted from the application provider 101 to the IC card 103, the encrypted portions could not be read unless the third party had the correct keys and decryption algorithm. That information, therefore, is protected in the KTU 207.

The KTU 207 is used to allow an intended IC card 103 (an IC card for which the application and associated data are intended) to decrypt the encrypted portions of the AU 203 by describing which portions of the AU 203 are encrypted, which encryption algorithm was used, and the key or keys to be used to decipher the text. This information is highly confidential between the application provider 101 and the intended IC card 103, and therefore is protected in a manner unique to the intended IC card 103. In order to encrypt the KTU 207 which is part of the overall application load unit 111 being transmitted, an individual key set for the particular intended IC card 103 is used. The key set and its generation will now be described.

In accordance with the present invention, one of the security operations performed at the certificate authority (CA) 109 is to generate an individualized key set for each IC card which is stored on the IC card. The key set is used for off-card verification (i.e., to verify that the IC card is an authentic IC card) and for secure data transportation. The key generation method is shown generally in FIG. 4. The key set is made up of three different key data items: the IC card's private key, which is known only to the IC card; the IC card's public key, which is stored on the IC card; and the IC card's public key certificate, which is the IC card's public key signed by the CA's private key. The individual keys of the key set are described in more detail below.

Step 401 stores an IC card specific transport private key for the individual IC card in the memory of the IC card. This private key is generated by the CA 109 from a standard asymmetric encryption technique such as RSA™ and loaded onto the IC card 103 via an IC card acceptance device. Once stored on the IC card, the CA 109 deletes from its own memory any data relating to the private key. Thus, only the IC card itself knows its private key. The data element containing the private key information in the IC card is called "mkd_sk" which stands for MULTOS key data secret key.

Step 403 stores a card specific transport public key for the individual IC card 103 in the memory of the IC card 103. This public key is preferably generated by the CA 109 from the asymmetric encryption technique used to produce the private key in step 401. As with the private key, once the public key is stored on the IC card 103, the CA 109 (or other key provider) deletes from its systems the public key data, so that the only copy of the public key is kept in the IC card 103. The data element containing the IC card's public key information is called "mkd_pk" which stands for MULTOS key data public key.

Step 405 stores a card specific transport public key certificate for the individual IC card 103 in the memory of the IC card 103. The data element containing the IC card's public key certificate information is called "mkd_pk_c", which stands for MULTOS key data public key certificate. This public key certificate is preferably generated by signing the transport public key mkd_pk with the private key of the CA 109, indicated as follows:

$$Mkd\_pkc = [mdk\_pk]_{CA\_sk}$$

which means the individual IC card's public key certificate is formed by applying the CA's private key to the individual IC card's public key. The process is carried out at the CA 109. The public key certificate is retained by the CA 109 so that it can regenerate the public key as needed.

A terminal can read the public key certificate from an IC card to verify that the CA 109 had signed and therefore approved the individual IC card 103. This is accomplished by verifying the public key certificate with the public component of the CA key set used to sign the mkd_pk. The decrypted public key certificate can then be compared with the public key to verify that the key certificate was certified (signed) by the CA.

Figure 5:
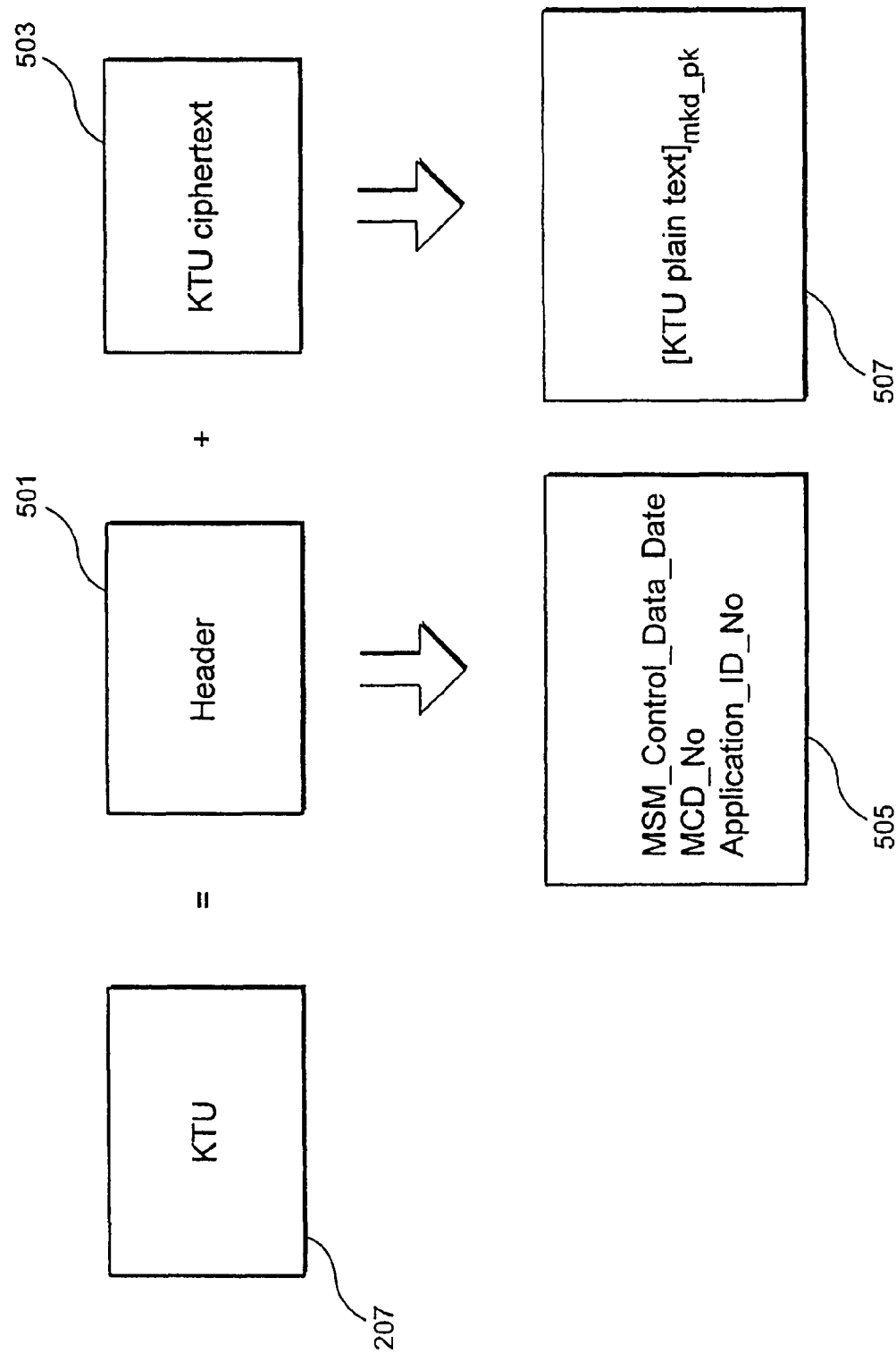
FIG. 5 is a graphic representation of a key transformation unit.

FIG. 5 is a graphic depiction of the contents of key transformation unit (KTU) 207, which contains header portion 501, and KTU ciphertext portion 503. As shown in FIG. 5, header information 501 includes, for example, identifier or permissions information 505 such as the application_id_no (application identification number), mcd_no (IC card no), and/or msm_control_data_date (the date the IC card was issued). Additional identifiers could also be included. These identifiers allow the system to verify that an IC card which receives the application load unit 111 is the intended IC card 103. The permissions data is discussed in detail in the above referenced related patent.

KTU ciphertext 503 corresponds to KTU plaintext (not encrypted) encrypted with the public key mkd_pk of the intended IC card 103 as shown in box 507. The KTU plaintext is further described in FIG. 6. The public key mkd_pk is obtained from the intended IC card 103 by the application provider 101. The public key of an IC card is freely available to anyone, and can be obtained directly from the IC card or from the certificate authority 109. By encrypting the KTU plaintext with the IC card public key, only the intended IC card 103 can use its private key of the public/private key pair to decrypt the KTU ciphertext 503. This means that only the intended IC card 103 can determine the contents of the KTU plaintext, identify the encrypted portions of the application being loaded, and use the keys to decrypt and recover the entire application and associated data. Because no other entity has the private key of the IC card 103, the security and integrity of the program code and data being transmitted are ensured.

Figure 6:
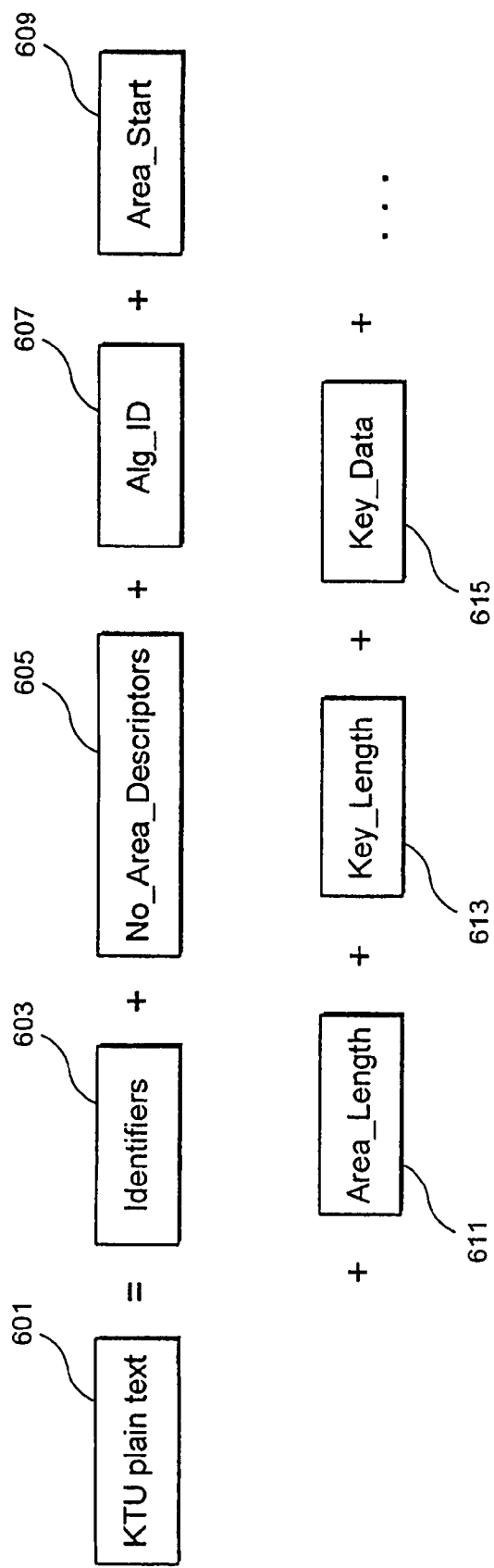
FIG. 6 is a graphic representation of a key transformation unit plaintext.

FIG. 6 is a graphic representation of KTU plaintext 601. KTU plaintext 601 preferably includes identifier field 603, no_area_descriptors field 605, alg_id field 607, area_start field 609, area_length 611, key_length field 613, key_data field 615, and additional area and key fields depending upon the number of encrypted areas present in the application unit (AU) 203. Identifiers 603 contain identifying information of the AU 203 to which the KTU 207 applies. No_area_descriptors 605 indicates how many different portions of the AU 203 have been encrypted. In the example of FIG. 3, the number of area descriptors is three. Field 607 contains the algorithm identifier for the first area which has been encrypted. The algorithm could be DES or triple DES, for example. Field 609 indicates the start of the first encrypted area. This indication could be an offset from the start of the AU 203. For example, the offset could be "100", which means that the first area starts at the 100$^{th}$ byte of the AU 203. Field 611 indicates the area length for the first encrypted portions. This field allows the microprocessor on the IC card to know how large an area has been encrypted, and, when coupled with the start of the area, allows the IC card microprocessor to decrypt the correct portion of the AU 203. Field 613 indicates the key length for the particular encrypted portion of the AU 203. The length of the key differs for different encryption techniques. The key length field allows the IC card 103 to know the length of the key data. Field 615 indicates the key data for the particular encrypted portion. The key data is used with the algorithm identity and the location of the encoded portion to decode the encrypted portion. When more than one encrypted area is indicated, additional data referring to the algorithm, start location, length, key length, and key data are present in the KTU plaintext 601. While a number of fields have been described, not all the fields are necessary for the invention. The most important field, however, is the key data 615 itself.

Figure 7:
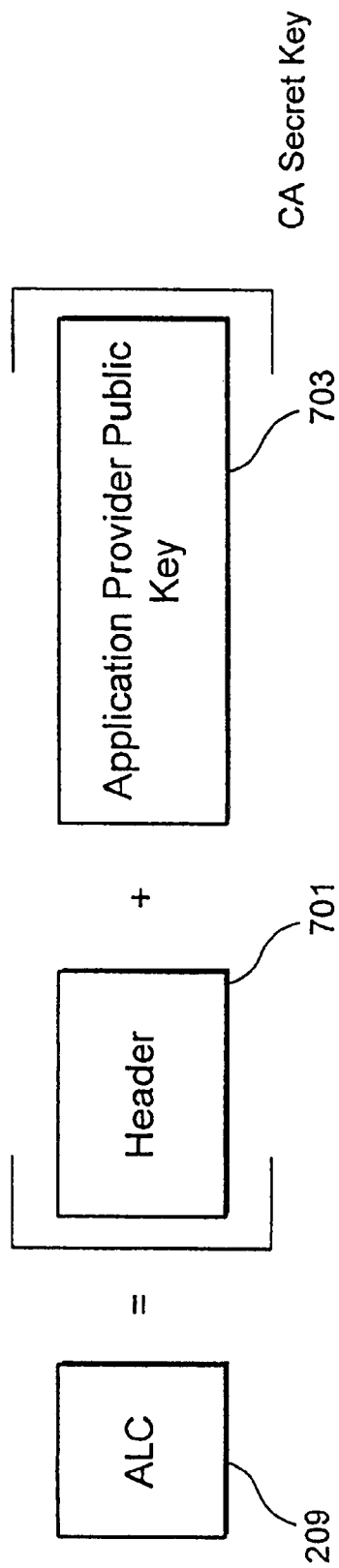
FIG. 7 is a graphic representation of an application load certificate.

FIG. 7 is a graphic representation of the application load certificate (ALC) 209. ALC 209 includes a header 701 and the application provider public key 703. Header 701 and application provider public key 703 are then signed (encrypted) with the certificate authority (CA) private key. Thus, the ALC 209 must be provided by the CA 109 to the application provider 101 for each application loaded, because only the CA 109 knows the CA private key. Header 701 contains information regarding the application provider 101 and the IC card 103 for which the application is intended. The ALC 209 is placed in the correct application load unit (ALU) 111 by the application provider 101 which can use the identification information. Application provider public key 703 is provided to the CA 109 along with the identification data. The CA 109 then signs this information after verifying its authenticity, and returns the signed ALC 209 to the application provider 101. The IC card 103, when it receives the ALC 209 as part of the ALU 111, verifies the ALC 209 with the public key of the CA 109. This ensures that the CA 109 signed the ALC 209 and that it is genuine. After verifying the information, the header identification information 701 is checked and the application provider public key is recovered. This public key is used to verify that the application and code which is to be loaded onto the IC card 103 originated with the proper application provider 101.

Figure 8:
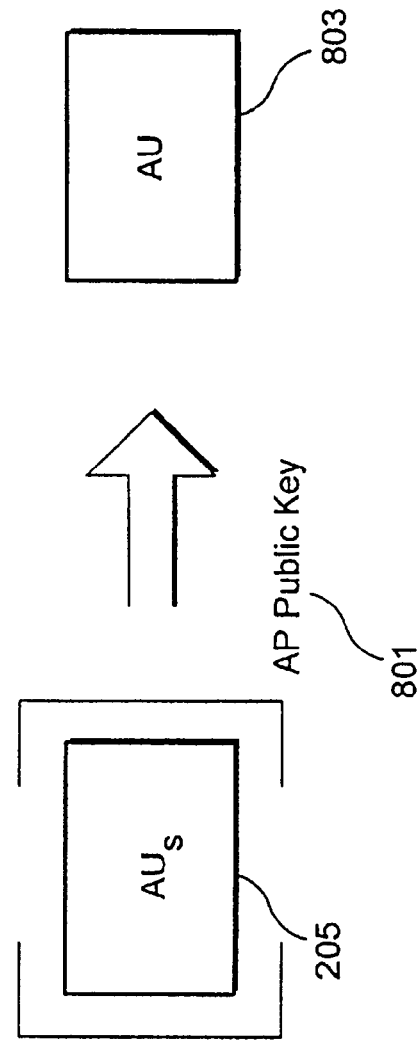
FIG. 8 is a graphic representation of an application unit being decrypted.

FIG. 8 is a graphic representation of the use of the application provider's public key to verify the signature of the application unit signature (AU$_s$.) 205 in order to verify that application unit (AU) 203 was signed by the application provider 101. AU$_s$ 205 is verified with the application provider public key 801. The recovered AU 803 is then compared with AU 203. When the data blocks match, the IC card 103 has verified that the application provider signed (encrypted) the AU 203, and that the application is genuine. This authentication is valid, because only the application provider 101 has its own private key. The IC card can process this information efficiently, because the application provider's public key 801 is provided to it as part of the ALC 209, which is signed by the CA 109. Therefore, it does not need to retrieve the public key from an external location to authenticate the application.

Figure 9:
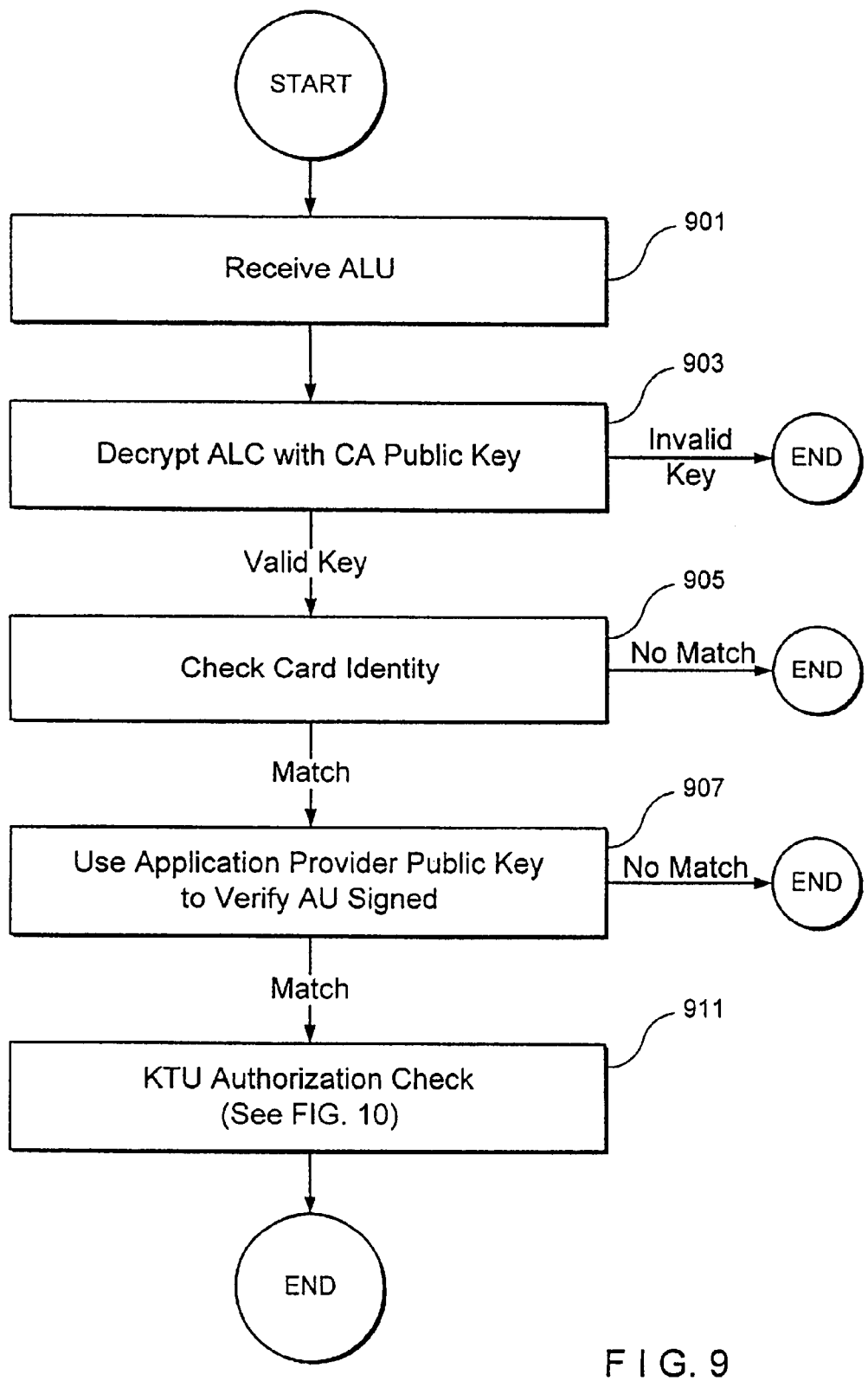
FIG. 9 is a flowchart illustrating steps undertaken in processing an application load unit.

FIG. 9 shows a flow chart of the steps for processing the application load unit (ALU) 111 when it is received by the IC card 103. Prior to receiving the ALU 111, identity checks as to the identity of the IC card 103 can be performed, if desired. The ALU processing techniques provide a number of further verifications, including verifying that the application being loaded is: (1) from the correct application provider 101, (2) being loaded onto the intended IC card 103, and (3) certified by the CA 109. The ALU processing techniques also allow the transportation of transport decryption keys, which enable the IC card 103 to decrypt portions of the program code and associated data in a secure manner. In step 901, IC card 103 receives ALU 111 from the application provider 101. ALU 111 can be transmitted via a terminal connection, contactless connection, telephone, computer, intranet, Internet, or any other communication means. The ALU 111 is placed in an I/O buffer of the IC card 103 along with header information indicating the starting addresses of AU 203, AU$_s$ 205, the key transformation unit 207, and ALC 209. Alternatively, IC card 103 could determine the relative address locations of these four units.

Step 903 decrypts ALC 209 with the public key of CA 109. Each IC card 103 preferably stores in its memory a copy of the CA public key, because it is used in many transactions. Alternatively, the IC card 103 could obtain the public key from a known storage location. When the CA public key successfully verifies the ALC 209, IC card 103 has verified that CA 109 has signed ALC 209 with its private key and, thus, that ALC 209 is proper. When IC card 103 cannot verify ALC 209 successfully, ALC 209 was not signed by CA 109 and the certificate is not proper. The application loading process then ends.

Step 905 then checks the identity of IC card 103 against the identification information sent in ALC 209 to make sure the IC card is intended to receive the application. This permissions checking is described in the related patent identified above. When there is no match of identification data, the application loading process ends. When the identification data does match, the process continues.

Step 907 uses the application provider's public key 801, which was recovered from the verified ALC 209, to verify application unit signature (AU$_s$.) 205. When the application load unit (ALU) 111 was generated by the application provider 101, the application unit 203 was signed with the application provider's private key to authenticate that the application was provided by the correct application provider 101. The application provider 101 then provides its public key to IC card 103 through the ALC 209. The IC card 103 then verifies the $AU_s$ 205. When the ALU 111 is successfully verified, it is accepted as having been generated by the application provider 101. Because the application provider's public key is part of ALC 209 which is signed by the certificate authority (CA) 109, CA 109 can make sure that the proper public key has been provided to IC card 103. This unique key interaction between the application provider 101, CA 109 and the intended IC card 103 ensures that no counterfeit or unapproved applications or data are loaded onto an IC card which is part of the secure system.

Step 911 then processes a key transformation unit (KTU) authentication check, which further verifies that only the intended IC card 103 has received the application. The KTU authentication check makes sure that, when a third party does somehow intercept ALU 111, the third party cannot read the enciphered portions of the application unit (AU) 203 and cannot retrieve the keys to decrypt AU 203. This step is further explained in FIG. 10.

Figure 10:
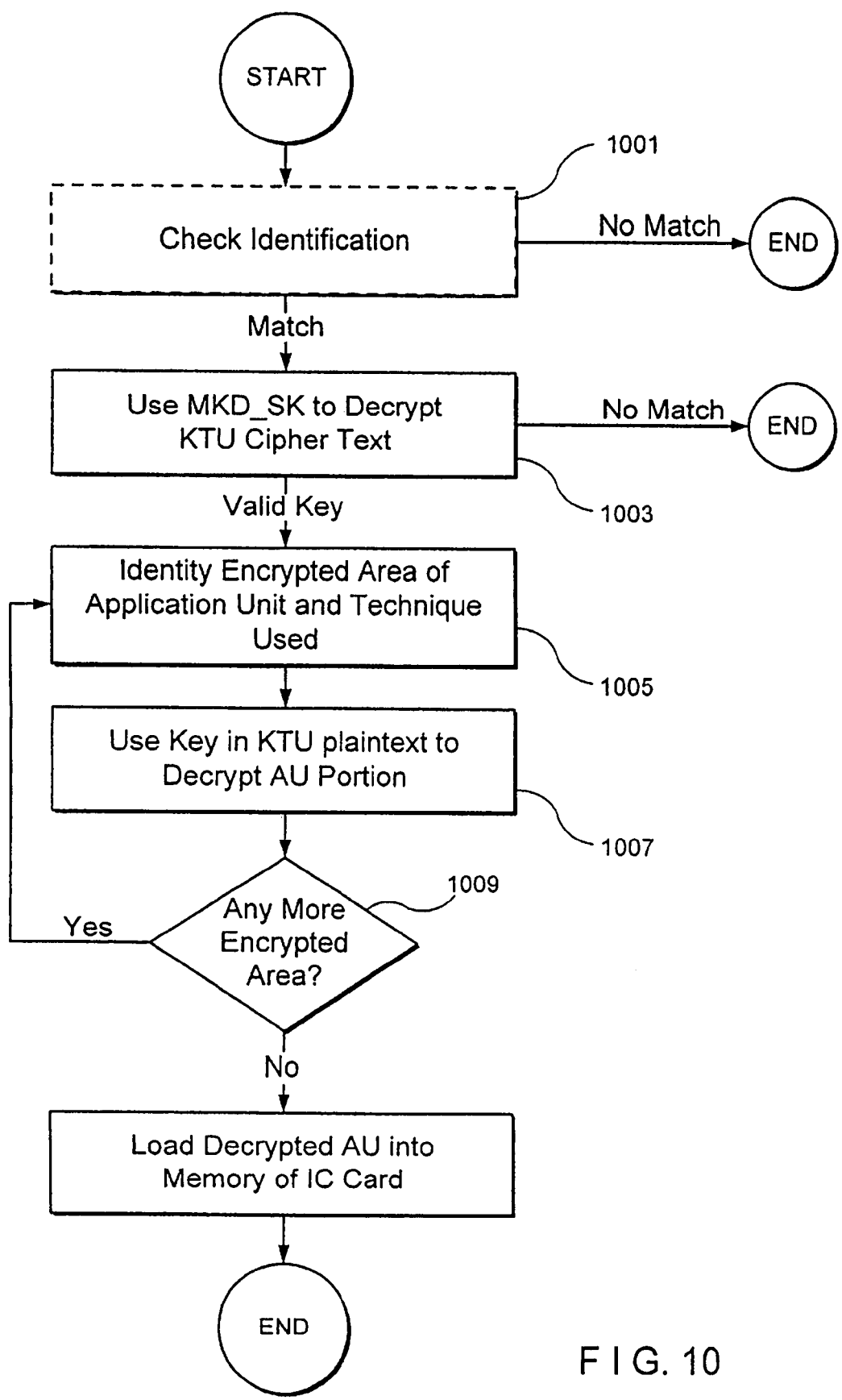
FIG. 10 is a flowchart illustrating steps undertaken in processing a key transformation unit.

FIG. 10 shows the steps of the KTU authentication process. Step 1001, which is shown in dashed lines because it is preferably optional, checks the identification of IC card 103 a second time. The identification information can be sent as part of the KTU data. However, this check is optional as it has already been performed once in step 905.

Step 1003 then decrypts KTU ciphertext 503 using the IC card's private key (mkd_sk). The KTU plaintext was previously encrypted using the intended IC card's public key (mkd_pk). This means that only the holder of the intended IC card's private key could decrypt the encrypted message. The application provider 101 obtains the intended IC card's public key either from the IC card 103 itself (See FIG. 4 and related text for a discussion of the mkd key set) or from a database holding the public keys. When the IC card 103 cannot decrypt the KTU ciphertext properly, KTU 207 is not meant for that IC card and the application loading process halts. When the IC card 103 does properly decipher the KTU ciphertext, the process continues.

Step 1005 identifies an encrypted area of the application unit (AU) 203. In the example of the KTU plaintext described in connection with FIG. 6, IC card 103 uses a relative starting address and area length field to determine the encrypted portion. Step 1005 also identifies which encryption technique was used to encrypt the identified portion so that the proper decryption technique can be used. For example, the technique could by single or triple DES. Alternatively, the technique could be a default technique used in the system and need not be identified.

Step 1007 then retrieves the key from KTU plaintext and decrypts the identified portion with the identified decryption technique. This allows IC card 103 to have the decrypted portion of AU 203, which it will store in its EEPROM once all the encrypted portions have been decrypted.

Step 1009 checks whether there are any other additional encrypted areas. In the example described in FIG. 3, there are three encrypted areas. The number of encrypted areas was a field in the example of FIG. 6. However, the number of portions can be determined using other conventional means. When there are additional encrypted portions, the process jumps to step 1005. When there are no additional encrypted portions, the process continues with step 1011.

Step 1011 then loads the decrypted application unit 203 into the memory of IC card 103. The application load unit (ALU) has passed all of the authentication and decryption checks and the application can now properly reside on IC card 103 and be executed and used by the IC card user. While the different checks have been presented in a particular order in FIGS. 9 and 10, the checks can be performed in any order. While all of the described techniques used in conjunction with the ALU provide the best security, one or more of the individual techniques could be used for their individual purposes or combined with other conventional security techniques.

Figure 11:
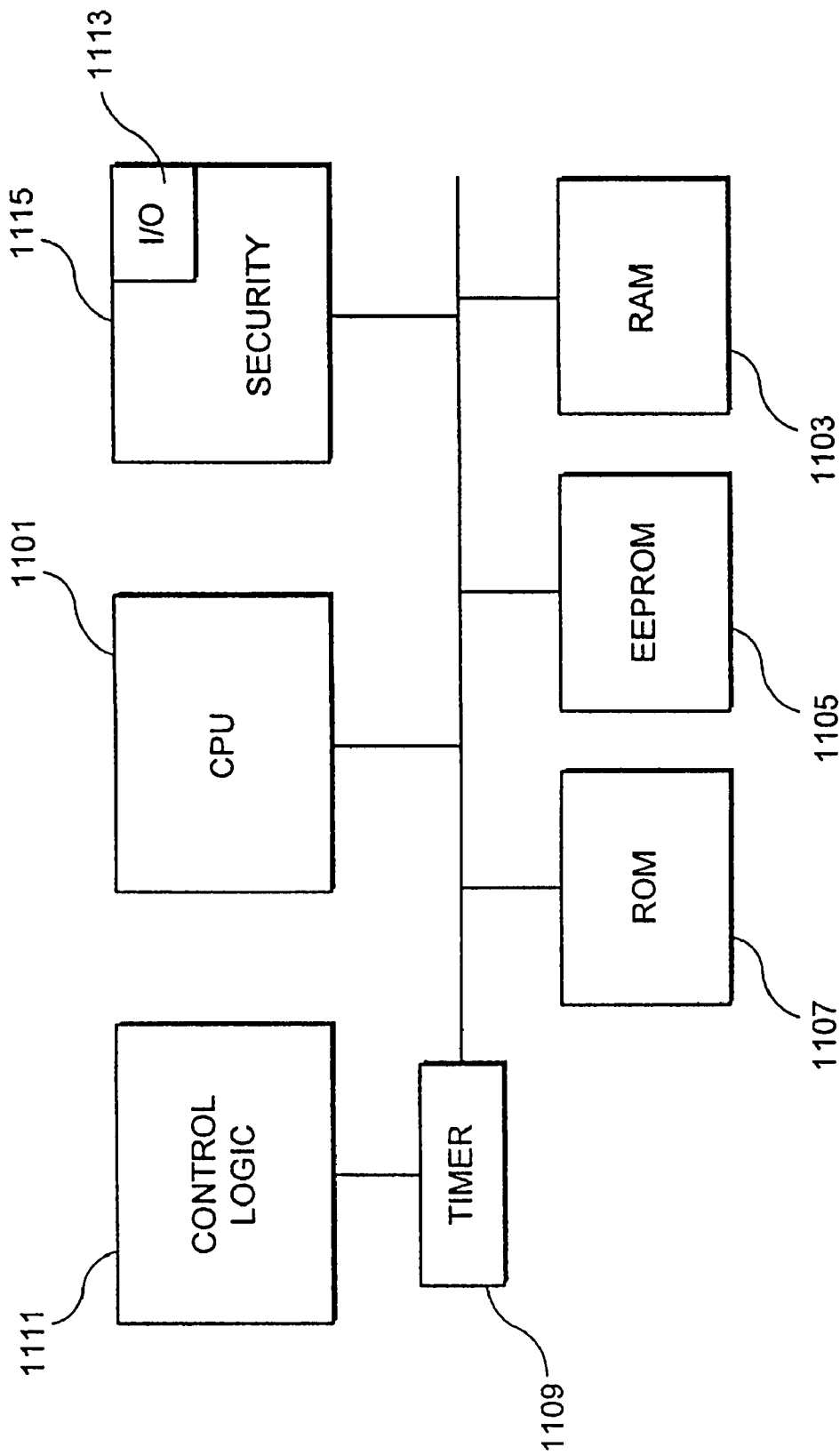
FIG. 11 is a block diagram showing components of an IC card which can receive and process an application load unit.

FIG. 11 shows an example of a block diagram of an IC card chip upon which an ALU can be loaded and processed. An integrated circuit is located on an IC card for use. The IC card preferably includes a central processing unit 1101, a RAM 1103, an EEPROM 1105, a ROM 1107, a timer 1109, control logic 1111, an I/O port 1113 and security circuitry 1115, which are coupled together by a conventional data bus.

Control logic 1111 provides sufficient sequencing and switching to handle read-write access to the IC card's memory through the input/output ports 1113. Central processing unit (CPU) 1101 with its control logic 1111 can perform calculations, access memory locations, modify memory contents, and manage input/output ports. Some IC cards have a coprocessor for handling complex computations such as performing cryptographic operations. Input/output ports 1113 are used under the control of CPU 1101 and control logic 1111, for communications between the IC card and a card interface device. Timer 1109 (which generates or provides a clock pulse) drives the control logic 1111 and CPU 1101 through a sequence of steps that accomplish memory access, memory reading or writing, processing, and data communication. A timer may be used to provide application features such as call duration. Security circuitry 1115 includes fusible links that connect the input/output lines to internal circuitry as required for testing during manufacture, but which are destroyed ("blown") upon completion of testing to prevent later access. After the ALU has been authenticated and verified, the data from application unit 203 is stored in EEPROM 1105. The IC card private key is stored in a secure memory location. The IC card public key and public key certificate is preferably stored in EEPROM 1105. The authentication process as described herein is performed by CPU 1101.

FIG. 11 also shows a possible configuration for the integrated circuit chip for the application provider 101, transmitting entity 10 and for the certificate authority 109. CPU 1101 present in IC card 103 for the application provider 101 encrypts the necessary information using encryption techniques described herein, and performs the necessary data operations. CPU 1101, present in the CA 109, is used to sign the application load and the public key certificate as described herein.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application is discussed herein, the same secure loading processes can apply to transmitting other types of data such as data blocks, database files, word processing documents, or any other type of data need to be transmitted in a secure manner.

Furthermore, although the foregoing description of the preferred embodiments revolves around a discussion of IC cards (or "smart cards"), the presently claimed methods and apparati are applicable to all tamper resistant modules generally, and not just to such cards. Thus, the term "tamper resistant module" can be used in lieu of the term "IC card" or "smart card" throughout this written description. The term "tamper resistant module" includes, but is not limited to, one or more IC cards, smart cards, dongles, PC cards, and/or PCMCIA cards. The IC cards, smart cards, dongles, PC cards, and/or PCMCIA cards may be coupled to one or more computers. Moreover, the term "personal computer/tamper resistant module combination" can be substituted for "IC card" or "smart card" throughout this written description, and the term "PC" as used herein can mean any type of computer.

Similarly, it will be appreciated that references to "software" modules include modules that can be implemented in any combination of software, firmware, and/or hardware. Such modules can be embodied in one or more computer-readable media, such as one or more hard disks, floppy disks, CD's, DVD's, etc.

We claim:

1. A method for processing a data transmission, said method comprising the steps of:
    receiving said data transmission, said data transmission comprising an executable software application encrypted with a first key, and a key transformation unit (KTU) encrypted with a second key, wherein said executable software application comprises at least one encrypted portion having an associated location, and said KTU comprises said first key and a location indicator for said associated location;
    decrypting said KTU onto a tamper resistant module (TRM) to recover said first key and said location indicator;
    identifying said encrypted portion associated with said associated location;
    decrypting said encrypted portion of said executable software application onto said TRM using said first key for each encrypted portion; and
    storing said decrypted executable software application in memory of said TRM for subsequent execution.

2. The method of claim 1, wherein said second key is from a public key and private key set used in asymmetric encryption.

3. The method of claim 1, wherein said KTU further indicates a technique used to encrypt said portion of said executable software application.

4. The method of claim 1, further comprising the step of enciphering a second portion of said executable software application independently of said encrypted portion of said executable software application.

5. The method of claim 4, wherein said second portion is encrypted using a second encryption technique, and said KTU indicates said second encryption technique.

6. The method of claim 4, wherein said second portion is encrypted using a second key, and said KTU indicates said second key.

7. The method of claim 4, wherein said KTU comprises a second location indicator for said second portion of said executable software application.

8. The method of claim 1, wherein said KTU indicates an associated location for each portion of said executable application.

9. The method of claim 1, further comprising the steps of:
    providing a software application provider (SAP) with an SAP public key and an SAP private key;
    providing a certification authority (CA) with a CA public key and a CA private key;
    signing said SAP public key using said CA private key to produce an application load certificate;
    further encrypting said encrypted application using said SAP private key to produce a signed application; and
    transmitting said signed application and said application load certificate to said TRM.

10. The method of claim 9, further comprising the step of said TRM verifying said application load certificate with said CA public key.

11. The method of claim 10, further comprising the step of verifying the signed application using said SAP public key from said application load certificate to produce a verified application unit.

12. The method of claim 11, wherein said verified application unit is compared to said application unit to determine whether said verified application unit and said application unit are equivalent.

13. Apparatus for processing a data transmission, said apparatus comprising:
    means for receiving said data transmission, said data transmission comprising an executable software application encrypted with a first key, and a key transformation unit (KTU) encrypted with a second key, wherein said executable software application comprises an encrypted portion having an associated location, and said KTU comprises said first key and a location indicator for said associated location;
    means for decrypting said KTU onto a tamper resistant module (TRM) to recover said first key and said location indicator;
    means for identifying said encrypted portion;
    means for decrypting said encrypted portion onto said TRM using said first key for said encrypted portion; and
    means for storing said decrypted executable software application in memory of said TRM for subsequent execution.

14. The apparatus of claim 13, wherein said second key is from a public key and private key set used in asymmetric encryption.

15. The apparatus of claim 13, wherein said KTU further indicates a technique used to encrypt said encrypted portion.

16. The apparatus of claim 13, further comprising means for enciphering a second portion of said executable software application independently of said encrypted portion.

17. The apparatus of claim 16, wherein said second portion is encrypted using a second encryption technique, and said KTU indicates said second encryption technique.

18. The apparatus of claim 16, wherein said second portion is encrypted using a second key, and said KTU indicates said second key.

19. The apparatus of claim 16, wherein said KTU comprises a location indicator for said second portion.

20. The apparatus of claim 16, wherein said KTU comprises a location indicator for an associated location corresponding to each portion.

21. The apparatus of claim 16, further comprising:
    a certification authority (CA) arrangement providing a respective CA public key; and
    means for verifying an application load certificate using the CA public key.

22. The apparatus of claim 21, further comprising means for providing a software application provider with an SAP public key for verifying the signed encrypted application using said SAP public key located in said verified application load certificate.

23. The apparatus of claim 22, wherein said verified application signature is compared to said encrypted application to determine whether they are equivalent.

24. A method for processing a data transmission, said method comprising the steps of:

- receiving said data transmission, said data transmission comprising an executable software application encrypted with a first key, and a key transformation unit (KTU) encrypted with a second key, wherein said executable software application comprises an encrypted portion having an associated location, and said KTU comprises said first key and a location indicator for said associated location;
- decrypting said KTU onto a personal computer (PC) having at least one tamper resistant module (TRM) to recover said first key and said location indicator;
- identifying said encrypted portion;
- decrypting said encrypted portion of said executable software application onto a combination of PC and TRM (PC/TRM) using said first key for said encrypted portion; and
- storing said decrypted executable software application in memory of said PC/TRM for subsequent execution.

25. Apparatus for processing a data transmission, said apparatus comprising:

- means for receiving said data transmission, said data transmission comprising an executable software application encrypted with a first key, and a key transformation unit (KTU) encrypted with a second key, wherein said executable software application comprises an encrypted portion having an associated location, and said KTU comprises said first key and a location indicator for said associated location;
- means for decrypting said KTU onto a personal computer (PC) having at least one tamper resistant module (TRM), a PC and TRM combination (PC/TRM) being operable to recover said first key and said location indicator;
- means for identifying said encrypted portion;
- means for decrypting said encrypted portion onto said PC/TRM using said first key for said encrypted portion; and
- means for storing said decrypted portion in memory of said PC/TRM for subsequent execution.

* * * * *

UNITED STATES PATENT AND TRADEMARK OFFICE
CERTIFICATE OF CORRECTION

| | | |
|---|---|---|
| PATENT NO. | : 7,730,311 B2 | Page 1 of 1 |
| APPLICATION NO. | : 11/977945 | |
| DATED | : June 1, 2010 | |
| INVENTOR(S) | : David Barrington Everett et al. | |

It is certified that error appears in the above-identified patent and that said Letters Patent is hereby corrected as shown below:

On the Title Page Item (63) in the Related U.S. Application Data section:

• 09/023,057, filed on Dec. 12, 1998 should read   -- 09/023,057, filed on Feb. 12, 1998 --.

Signed and Sealed this

Fifth Day of October, 2010

David J. Kappos
*Director of the United States Patent and Trademark Office*